April 27, 1971     M. TOKAR, JR     3,576,745

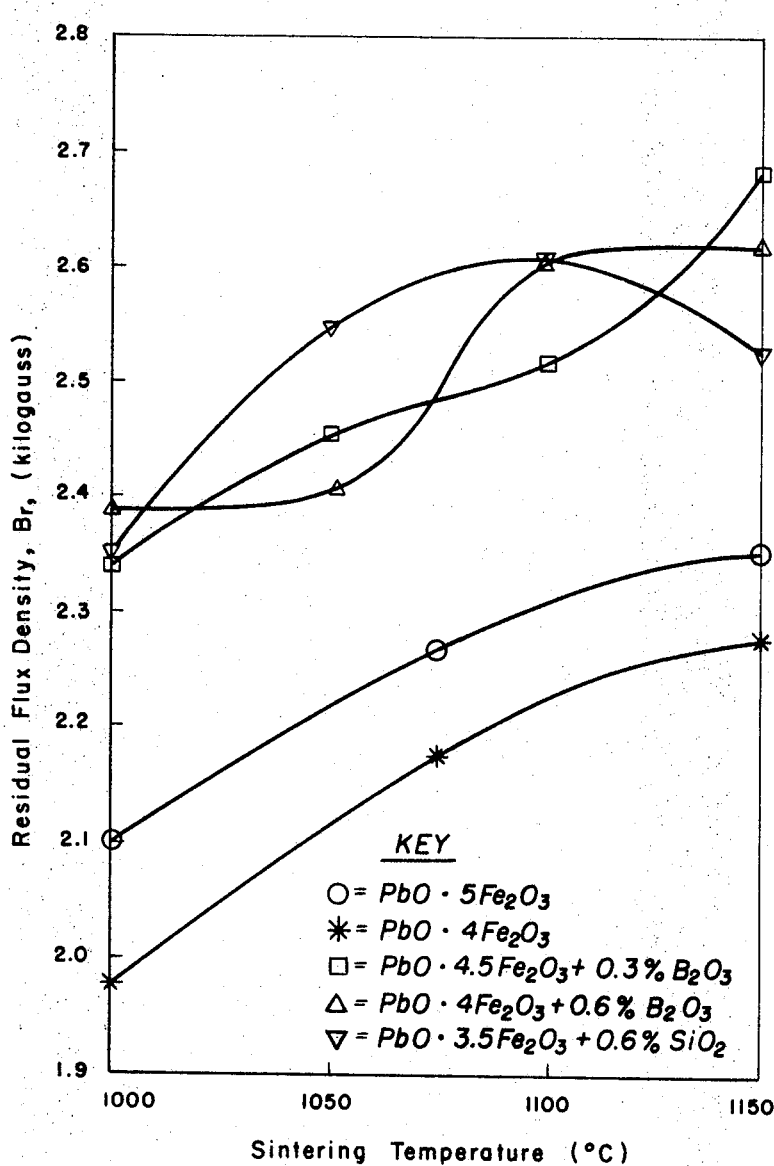

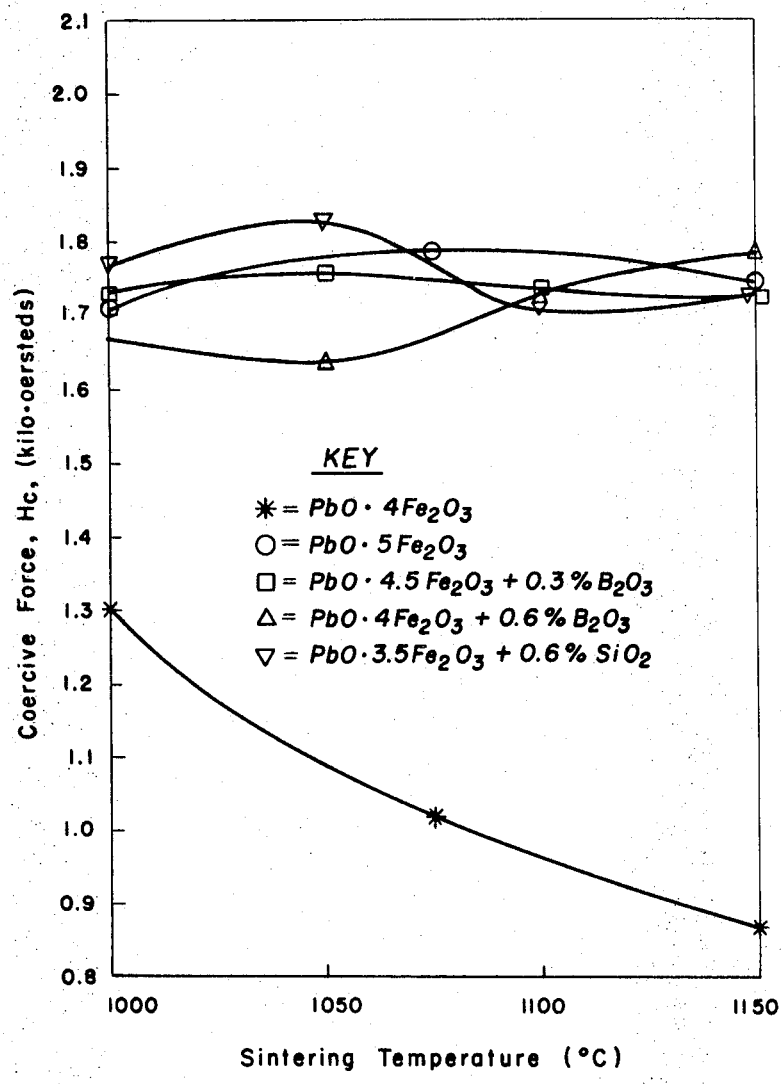

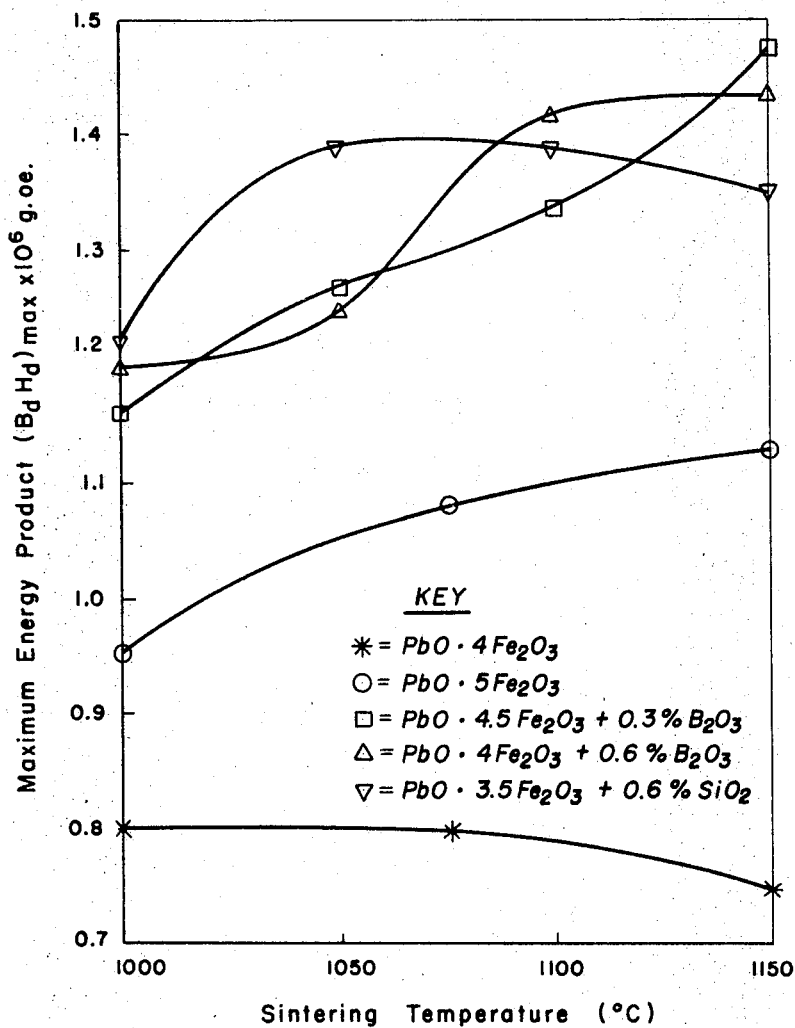

MANUFACTURE OF HARD LEAD FERRITES

Filed May 20, 1968

United States Patent Office 3,576,745
Patented Apr. 27, 1971

3,576,745
MANUFACTURE OF HARD LEAD FERRITES
Michael Tokar, Jr., Los Alamos, N. Mex., assignor to International Lead Zinc Research Organization, Inc., New York, N.Y.
Filed May 20, 1968, Ser. No. 730,535
Int. Cl. H01f 1/11
U.S. Cl. 252—62.58                        13 Claims

ABSTRACT OF THE DISCLOSURE

The present application discloses a method for making an essentially unoriented hard lead ferrite by calcining a mixture of lead oxide and iron oxide powders in the mole ratio about 1:4.5 to 1:6 PbO to $Fe_2O_3$ equivalent, at a temperature of about 850° C. to 1150° C., preferably 1000°–1075° C., thereby to form a PbO·iron oxide calcine. Into this calcine there is then incorporated any of several additive agents which improve the magnetic properties of the final ferrite, particularly the maximum energy product $$(B_dH_d)_{max}$$

These additives include lead silicate, silica (quartz), lead borate and $B_2O_3$. The amount of the additive is such as to effect in the final sintered ferrite an overall mole ratio in the range of about 1:3.5 to 1:5.5 PbO to $Fe_2O_3$ and about 0.2 to 0.9% by weight of $SiO_2$ or $B_2O_3$ (combined with the PbO). The calcined material is then ground and pressed into slugs and the slugs are sintered at a temperature in the range of about 1000 to 1150° C., preferably about 1050° to 1150° C., to form a sintered hard lead ferrite.

---

The present invention relates to the manufacture of essentially unoriented hard lead ferrite materials.

As discussed in an article by Professor John H. Koenig, American Society for Testing Materials, published in 1965, entitled "Electronic Ceramics," the development of the hard or permanent ferrites constituted a significant advance providing new design possibilities in a number of product areas. These materals possess high coercive force, high resistivity, low incremental permeability, and low specific gravity as compared with other magnetic materials. Also the hard ferrites have typically high energy product, high potential energy, and low loss. The high energy product and high coercive force are responsible for many of their electronic applications.

Unoriented ferrites have been very useful in the past for manufacture of many types of ferrite magnetic cores. Although oriented ferrites have the advantage of enjoying a higher energy product $(B_dH_d)_{max}$ than unoriented ferrites, they have the disadvantage of higher cost of manufacture due to the necessity of using an additional processing step, that is, the step of orienting the particles in the ferrite.

One object of the present invention is to prepare essentially unoriented hard lead ferrites which have a value of maximum energy product $(B_dH_d)_{max}$ which is substantially greater than those previously obtained by conventional procedures.

A further object of the invention is to prepare such ferrites having a maximum energy product in the range of about 1.2 to $1.4 \times 10^6$ g. oe. and above.

Other objects and advantages of the invention will appear from the following description.

Referring to the appended drawings:

FIG. 1 is a graphical presentation of the relationship between the sintering temperature and residual flux density for various lead ferrite compositions;

FIG. 2 is a graphical presentation of the relationship of sintering temperature and coercive force for several lead ferrite compositions;

FIG. 3 is a graphical presentation of the relationship between the sintering temperature and maximum energy product for various lead ferrite compositions;

Figure 4A:
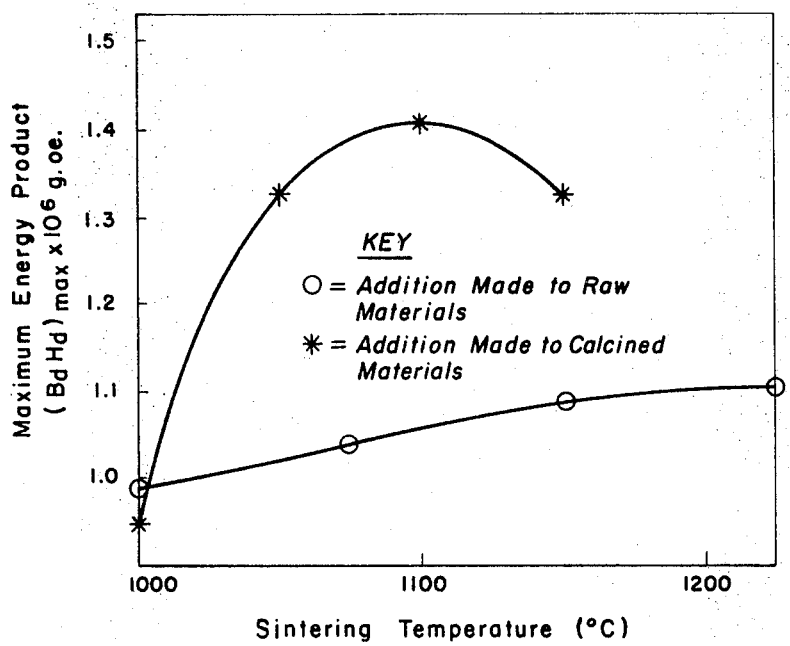
Figure 4B:
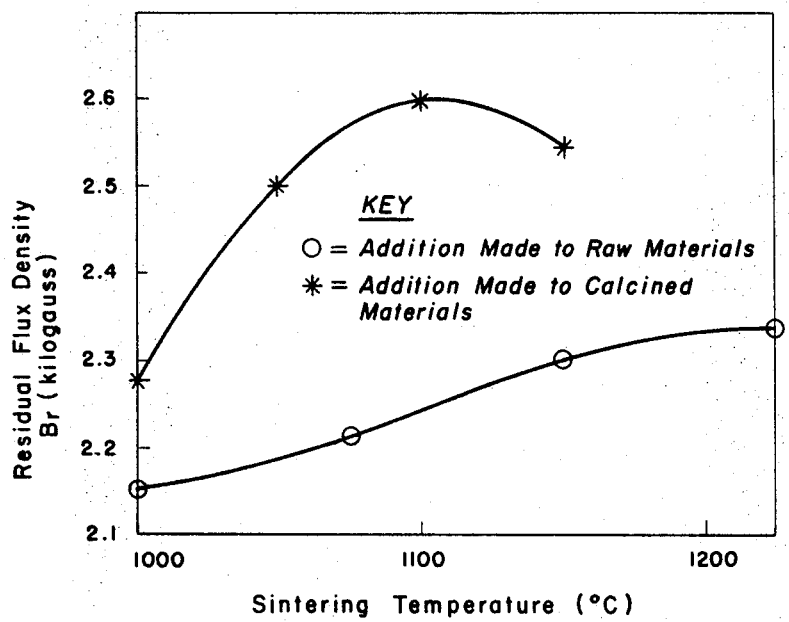

FIG. 4a is a graphical illustration of the relationship between the sintering temperature and the maximum energy product for materials made in accordance with the present invention as compared with other procedures; and FIG. 4b is a graphical illustration of the relationship between the sintering temperature and residual flux density for compositions made in accordance with the present invention as compared with other procedures.

The terminology used herein and certain background information will be found in a publication of Frank G. Brockman appearing in Ceramic Bulletin, vol. 47, No. 2 (1968), pages 186–194.

In accordance with the present invention essentially unoriented hard lead ferrites are made by a method which comprises first calcining a mixture of lead oxide and iron oxide powders in the mole ratio of about 1:4.5 to 1:5.5 PbO to $Fe_2O_3$ equivalent, at a temperature of about 850° C. to 1150° C. thereby to form a PbO·iron oxide calcine. Into this calcine there is then incorporated any of several additives, which agents improve the magnetic properties of the final ferrite, particularly the maximum energy product $(B_dH_d)_{max}$. These additives include lead silicate, silica (quartz), lead borate and $B_2O_3$. The amount of the additive is such as to effect in the final sintered ferrite a mole ratio in the range of about 1:3.5 to 1:5.5 PbO to $Fe_2O_3$ and about 0.2 to 0.9% by weight of $SiO_2$ or $B_2O_3$ (combined with the PbO). The calcined material (after grinding) is pressed into slugs and the slugs are sintered at a temperature in the range of about 1000 to 1150° C. to form a sintered hard lead ferrite.

It is believed that in accordance with my invention the silica and boria additions (whether as lead silicate or borate or otherwise) improve the magnetic properties by altering the microstructure. To be specific, it is believed that such additives have the following effects:

(a) They form low melting liquids at the sintering temperature and hence enhance the densification of the specimens. There is then more magnetic material per unit volume, and the residual induction $B_r$ and the maximum energy product $(B_dH_d)_{max}$ are, therefore, increased.

(b) A slight degree of orientation is imparted by the mechanical pressing operation by which the specimens are formed. This is increased during sintering. The presence of the additives increases this orientation still further thus increasing the residual induction and energy product.

(c) Upon cooling, the low melting material is retained at the grain boundaries thereby forming non-magnetic barriers to domain-boundary motion. Without this effect the coercive force would be drastically reduced.

A very important aspect of the invention resides in the addition of the additive to the precalcined, that is, pre-reacted, material. In this way the additives do not interfere with ferrite formation. There is less opportunity for them to react with the ferrite phase thereby forming detrimental non-magnetic phases. A small amount of non-magnetic material is, of course, formed, that is, the lead silicate or lead borate. Such material, as mentioned above, resides principally at the grain boundaries of the ferrite phase thereby acting as a barrier to domain wall motion and thereby counteracting the reduction of coercive force due to grain growth.

The combined effect of the increased densification due to the presence of the low melting fluxing agents, and the slight increase in orientation, as mentioned above, results in an overall increase in the flux density $B_r$ and the maximum energy product $(B_dH_d)_{max}$.

Form of the $SiO_2$ or $B_2O_3$ additive

It has been found that the form of the silica or boria additive exerts a decided effect upon the maximum energy product of the resulting lead ferrite material. The reason for this effect is not entirely understood. It is believed that the silica or the boria is present in the form of lead silicate or lead borate as the case may be, probably saturated with $Fe_2O_3$. This material is liquid at the sintering temperature. The borate or silicate, therefore, acts as a flux for the ferrite so that, upon sintering, it forms a more dense material. The additives which produce the desired effect of high energy product are (1) tribasic lead silicate, or (2) lead monosilicate, or (3) quartz or (4) lead borate or (5) $B_2O_3$, because they provide materials having energy products as high as $1.4 \times 10^6$ gauss oersteds or above. The tribasic lead silicate has the composition $PbO \cdot 0.33SiO_2$ with a composition on a weight basis of 92% $PbO$ and 8% $SiO_2$. The properties of the lead ferrite material obtained using this form of lead silicate have been found to be optimum probably because of the fact that its composition is a eutectic of the two forms of lead silicate, namely, the orthosilicate $2PbO \cdot SiO_2$ and tetra lead silicate $4PbO \cdot SiO_2$.

Tribasic lead silicate and lead monosilicate are preferred because with them the PbO loss due to vaporization during sintering is reduced. Moreover, since the PbO and $SiO_2$ are already in combined form when the silicate is used, there is less chance for reaction between the $SiO_2$ and $Fe_2O_3$.

The order of addition

It is important, in accordance with the present invention, to add the borate or silicate component to the lead ferrite after the latter has been calcined. The reason for this is again not completely understood but the observation is that by following such procedure the optimum energy products, that is, in the order of 1.2 to $1.4 \times 10^6$ gauss-oersteds and above can be obtained. It may be that if the silicate or borate additive is added to the uncalcined lead ferrite, the additive tends to react with more of the lead oxide, thereby interfering with the formation of the ferrite.

As a further explanation for the superior results obtained with the addition of the silicate or borate to the calcined ferrite, based upon photomicrographic observations, the silica or boria is believed to be combined with the PbO thus shifting the effective $PbO:Fe_2O_3$ ratio. If the $Fe_2O_3$ content is already high, this may result in the presence of free $Fe_2O_3$. If, however, PbO and $Fe_2O_3$ are already reacted in the ferrite phase, the silica will not have such a drastic effect due to the time required for diffusion of the PbO out of the ferrite crystal.

It is believed that the optimum composition of the lead ferrite material is that of the beta phase. Although his composiion has not been precisely determined, it is believed to be in the range of $PbO \cdot 5$ to $6Fe_2O_3$. It is surmised that if the additions of silica or boria are made to material having an excess of PbO over that of the beta phase, the amount of such excess being equal to the amount required to react with the additive, there will be sufficient PbO present to react with all of the $Fe_2O_3$. In this case, there will be no free $Fe_2O_3$. The absence of free $Fe_2O_3$ plus the benefits described above, derived from the presence of the low melting $PbO \cdot SiO_2$ (or $PbO—B_2O_3$) phase have significant and beneficial effects on the magnetic properties. These beneficial effects are reflected in the increased residual induction and energy product, provided the ratio of $Fe_2O_3$ to PbO is less than about 5. Improved magnetic properties are also found in materials in which the ratio of silica (or boria) to PbO is near the eutectic.

As expressed above, the ratio of PbO to $Fe_2O_3$ of the sintered product is from 1:3.5 to 1:5.5, but preferred materials are in the range 1:3.5 to 1:5.0.

The effect of calcining and sintering temperatures

The coercive force $H_c$ is highly dependent upon both the calcining and sintering temperatures. The highest values of coercive force for materials sintered from 850 to 1150° C. were obtained by calcining at 1000°–1075° C. Coercive force was increased with sintering temperatures of about 1000–1150° C. The samples calcined and/or sintered at the highest temperatures had lower values of coercive force because of grain growth. Thus, as the grain size increases beyond the size of a single grain, the coercive force, which is the magnetizing force required to reduce the flux density to zero, decreases because of domain-boundary motion. The existence of optimum calcining and sintering temperatures is due to the combined effect of:

(a) porosity which creates internal demagnetizing fields in the specimen, (b) grain size and its relation to domain size and domain-boundary movement, and (c) the effect of temperature on the reaction of lead oxide and iron oxide to form the lead ferrites.

Porosity may also make a positive contribution to the coercive force if the particles are of a diameter comparable to the thickness of the domain wall, since the pores will then act as barriers to the motion of the wall.

With regard to residual flux density $B_r$, the highest values (for non-doped material) were obtained with specimens prepared from material calcined at 1075° C.

With regard to the maximum energy product $(B_dH_d)_{max}$, the optimum calcining temperature for non-doped materials is about 1075° C. and the optimum sintering temperature is about 1150° C. Taking a value of $1 \times 10^6$ g. oe. as the minimum acceptable $(B_dH_d)_{max}$, acceptable non-doped lead ferrite magnets can be produced from lead oxide and iron oxide powders calcined as low as 850° C. providing that the sintering temperature is 1075–1150° C. The highest $(B_dH_d)_{max}$ value for a $PbO \cdot 5Fe_2O_3$ specimen was $1.17 \times 10^6$ g. oe. Since pure isotropic barium ferrite magnets have $(B_dH_d)_{max}$ values of about $0.8 \times 10^6$ g. oe., the lead ferrites are clearly superior magnetically. Furthermore, barium ferrites must be calcined at about 1000° C. and have an optimum sintering range of 1250–1300° C. The lower firing temperatures of the lead ferrites thus reduce the production costs. Moreover, in accordance with the present invention, the magnetic properties of lead ferrites are improved while the firing temperatures are lowered by the addition of the silica and boria additives described herein.

In view of the foregoing consideration, the calcining in accordance with the present invention is carried out at a temperature in the range of 850–1150° C., preferably in the range of 1000–1075° C. Sintering, on the other hand, is carried out in the range of about 1000 to 1150° C., preferably in the range of 1050–1150° C.

There is a trend toward lower sintering temperatures with increasing PbO and/or additive content. Thus, the optimum sintering temperature for $PbO \cdot 3.5Fe_2O_3 + 0.9\%$ boria specimens was 1000° C., whereas for $$PbO \cdot 4.5Fe_2O_3 + 0.3\%$$

boria specimens it was 1150° C.

The following general procedure is used for preparing unoriented hard lead ferrites in accordance with the present invention. The procedure is directed specifically to the preparation of $PbO \cdot 4.5Fe_2O_3 + 0.3\%$ $B_2O_3$, but can be used for other compounds as well.

(I) PREPARATION OF RAW MATERIALS

Lead oxide (Hammond Lead Company UHP (ultra high pure) PbO and high purity $Fe_2O_3$ (Pfizer 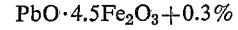)) were used. The initial material had a $PbO \cdot Fe_2O_3$ ratio of 1:5. This corresponds to a weight percent PbO of 21.8%.

For a 500 gram batch, 109 grams PbO and 391 grams $Fe_2O_3$ are placed in a laboratory ball mill with enough isopropyl alcohol to provide a viscous slurry. The mixture is milled for 24 hrs., although shorter times could be used. After milling, this slurry is poured through a 4 mesh sieve (to retain the grinding media) into an evaporating dish and dried. The dried cake is then passed through a 20 mesh sieve to granulate it. 100 grams of the granulated material at a time are tempered in a mortar with 10 grams of water and this again is passed through a 20 mesh sieve. The resulting powder is then pressed at 15,000 p.s.i. into discs (1 inch in diameter and about 1/16" thick weighing about 6 grams). After so pressing all of the material into discs, the discs are then dried in an oven at 140° C. for 24 hrs.

(II) CALCINING

The dried discs are placed in stacks on an alumina-sand base on a mullite setter in a Hevi-Duty Globar furnace. They are then heated at 1,000° C. (or other temperature chosen) for 2 hours at a heating rate of 10° C. per minute. The specimens are cooled in the furnace. After calcining, the top and bottom test discs are discarded.

(III) COMMINUTING

The calcined material is crushed manually in a steel mortar and pestle using a wooden mallet, to provide particles smaller than 20 mesh. Taking as a basis 100 grams of calcined ferrite, the PbO content (neglecting loss by evaporation) is 21.8 grams of 21.8%. Since it is desired to obtain $PbO \cdot 4.5Fe_2O_3$, and the additive to be used is lead borate frit containing 88.2% PbO, it is calculated that the amount of the lead borate to be added is 2.9 grams. The calcined ferrite is placed with the lead borate frit addition in the ball mill with enough isopropyl alcohol to cover the grinding media. The mixture is milled for 24 hrs. and then dried and granulated in the same manner as described above for the raw materials.

(IV) PRESSING THE SLUGS

To the dried and granulated mix is added 10% by weight of a solution of 2% ammonium alginate binder (Superloid) in water. This is blended in the mortar and then passed through a 20 mesh sieve. About 21 grams of this tempered mixture is then placed in the die and very carefully pressed into slugs of about 7/16 inch thick. The material is de-aired as much as possible by increasing the pressure slowly, then relieving it, reapplying the pressure, etc. The pressing is done from both directions (by suspending the die some distance above the die platen). The minimum pressing pressure is 15,000 p.s.i. The specimens are dried after pressing as previously described.

(V) SINTERING

The specimens are placed as before in the furnace using an old calcined disc on top and bottom (to prevent contamination from the refractory setter). The heating rate is 5° C. per minute to 600° C., and 10° C. per minute from 600° C. to the soaking temperature. The specimens are cooled in the furnace.

Testing of magnetic properties

Following the sintering step the specimens require grinding of the top and bottom faces in order to provide surfaces which are flat and parallel to 0.001 inch. This is necessary in order to avoid air gaps between the specimen surfaces and the pole faces of the electromagnet when the sample is being subjected to magnetic measurements. The specimens are ground using a diamond-impregnated grinding wheel.

After being ground the dimensions of the specimens are determined with calipers and the specimens are weighed on a semi-micro balance. From these data the bulk densities of the specimens are calculated.

The magnetic test equipment, assembled from individual components, includes an electromagnet, an $x-y$ recorder, a fluxmeter, a gaussmeter, a D-C motor-generator to power the electromagnet, and various electrical components to complete the circuitry. The electromagnet is equipped with 2 inch diameter tapered pole caps and is capable of producing 18,000 gauss in a one-half inch air gap. The field generated by the electromagnet is measured by a transverse Hall probe in conjunction with the gaussmeter.

The demagnetization curves for the ferrite specimens are obtained as follows: Twenty turns of insulated copper wire, No. 28 or 30 gauge, are wound around the circumference of the cylindrical specimens and the leads connected to the fluxmeter. By entering the number of area turns of the coil on the thumb wheel on the face of the fluxmeter it is converted to a direct reading gaussmeter. The thumbwheel-multiplier setting is chosen to provide 20,000 gauss full scale. While keeping the sample temporarily out of the field of the electromagnet, the applied field is brought to zero, and the fluxmeter is adjusted to provide zero drift. The specimen is then inserted in the gap between the faces of the pole caps which are then tightened into the flat faces of the specimen so as to eliminate the air gap. The specimen is then saturated by an applied field of about 15,000 oersteds. The field is then reduced to zero, the pen is placed on prepared graph paper in the $x-y$ recorder, and as the field opposite the magnetizing field is increased, the demagnetization curve is traced on the graph paper.

Following the foregoing procedures, hard lead ferrites were made having the composition $PbO \cdot 4.5Fe_2O_3 + 0.35\%$ silica. The silica was added as lead monosilicate $PbO \cdot SiO_2$. The initial ratio of PbO to $Fe_2O_3$ in the starting material was 1:5. Measurements were made of the remanence ($B_r$ in gauss), coercive force ($H_c$ oersteds), $(B_dH_d)_{max}$ gauss-oersteds and bulk density (grams per cc.) following the procedures described above. The results are presented in Table I.

TABLE I

| Example Number | Calcining temp. (° C.) | Sintering temp. (° C.) | Heating rate (deg./min.) | Soaking time (min.) | $(B_dH_d)_{max}$ ($\times 10^6$ g. oe.) | Coercive force, $H_c$ (oe.) | $B_r$ (gauss) | Bulk density (g./cc.) |
|---|---|---|---|---|---|---|---|---|
| $PbO \cdot 4.5Fe_2O_3 + 0.35\%$ silica (as lead monosilicate)—initially 1:5 | | | | | | | | |
| 1 | 1,000 | 1,000 | 5/10 | 60 | 1.13 | 1,670 | 2,170 | 4.64 |
| 2 | 1,000 | 1,050 | 5/10 | 60 | 1.22 | 1,720 | 2,395 | 5.01 |
| 3 | 1,000 | 1,100 | 5/10 | 60 | 1.33 | 1,535 | 2,610 | 5.26 |
| 4 | 1,000 | 1,150 | 5/10 | 60 | 1.30 | 1,415 | 2,620 | 5.36 |
| $PbO \cdot 4Fe_2O_3 + 0.35\%$ silica (as T.L.S.)—initially 1:5 | | | | | | | | |
| 5 | 1,000 | 1,000 | 5/10 | 60 | 1.17 | 1,645 | 2,200 | 4.61 |
| 6 | 1,000 | 1,050 | 5/10 | 60 | 1.22 | 1,665 | 2,405 | 5.04 |
| 7 | 1,000 | 1,100 | 5/10 | 60 | 1.29 | 1,535 | 2,570 | 5.38 |
| 8 | 1,000 | 1,150 | 5/10 | 60 | 1.35 | 1,480 | 2,630 | 5.44 |
| $PbO \cdot 4Fe_2O_3 + 0.7\%$ silica (as L.M.)—initially 1:5 | | | | | | | | |
| 9 | 1,000 | 1,000 | 5/10 | 60 | 1.05 | 1,670 | 2,200 | 4.82 |
| 10 | 1,000 | 1,050 | 5/10 | 60 | 1.26 | 1,635 | 2,480 | 5.31 |
| 11 | 1,000 | 1,100 | 5/10 | 60 | 1.36 | 1,620 | 2,650 | 5.40 |
| 12 | 1,000 | 1,150 | 5/10 | 60 | 1.36 | 1,640 | 2,630 | 5.41 |

It will be observed that the materials produced in Examples 2, 3 and 4 each had a value of $(B_dH_d)_{max}$ in excess of $1.2 \times 10^6$ gauss-oersteds, thus indicating very desirable ferrite materials.

Following the same procedure, other hard lead ferrites were made having the composition $PbO \cdot 4Fe_2O_3 + 0.35\%$ silica. The silica, however, was added as tribasic lead silicate, $PbO \cdot 0.33SiO_2$ which is the eutectic of lead orthosilicate, $2PbO \cdot SiO_2$, and tetra lead silicate $4PbO \cdot SiO_2$. The tribasic lead silicate contains 92% PbO and 8% $SiO_2$ by weight.

The similar measurements were made on the products and the results are also presented in Table I.

Here again Examples 6, 7 and 8 resulted in products to obtain the product $PbO \cdot 4.5Fe_2O_3 + 0.2\%$ $SiO_2$. The initial ratio of $PbO \cdot Fe_2O_3$ was 1:5. The calcining temperature was 1000° C. and the sintering temperatures for various samples ranged from 1000 to 1200° C. The optimum $(B_dH_d)_{max}$ was $1.18 \times 10^6$ at 1150° C. This somewhat lower value was attributable to the fact that the silica content (0.2%) was lower.

The procedure described above for making essentially non-oriented lead ferrites was repeated using tribasic lead silicate as the source of silica with an initial ratio of $PbO \cdot Fe_2O_3$ of 1:5. The product had the composition $PbO \cdot 3.5Fe_2O_3 + 0.6\%$ $SiO_2$. The usual measurements were made on the products and the results are summarized in Table II.

TABLE II

| Example Number | Calcining temp. (° C.) | Sintering temp. (° C.) | Heating rate (deg./min.) | Soaking time (min.) | $(B_dH_d)_{max}$ ($\times 10^6$ g. oe.) | Coercive force, $H_c$ (oe.) | $B_r$ (gauss) | Bulk density (g./cc.) |
|---|---|---|---|---|---|---|---|---|
| $PbO \cdot 3.5Fe_2O_3 + 0.6\%$ silica (as T.L.S.)—initially 1:5 | | | | | | | | |
| 15 | 1,000 | 1,000 | 5/10 | 60 | 1.22 | 1,825 | 2,350 | 5.07 |
| 16 | 1,000 | 1,050 | 5/10 | 60 | 1.39 | 1,835 | 2,545 | 5.43 |
| 17 | 1,000 | 1,100 | 5/10 | 60 | 1.40 | 1,690 | 2,620 | 5.56 |
| 18 | 1,000 | 1,150 | 5/10 | 60 | 1.38 | 1,645 | 2,595 | 5.50 |
| $PbO \cdot 5Fe_2O_3 + 0.3\%$ silica (as T.L.S.)—initially 1:6 | | | | | | | | |
| 19 | 1,075 | 1,000 | 5/10 | 60 | 0.99 | 1,710 | 2,170 | 4.31 |
| 20 | 1,075 | 1,050 | 5/10 | 60 | 1.04 | 1,770 | 2,200 | |
| 21 | 1,075 | 1,100 | 5/10 | 60 | 1.21 | 1,810 | 2,375 | 4.86 |
| 22 | 1,075 | 1,150 | 5/10 | 60 | 1.25 | 1,610 | 2,520 | 5.07 |
| $PbO \cdot 4Fe_2O_3 + 0.8\%$ silica (as quartz) | | | | | | | | |
| 23 | 1,000 | 1,000 | 5/10 | 60 | 0.95 | 1,570 | 2,280 | 4.95 |
| 24 | 1,000 | 1,050 | 5/10 | 60 | 1.33 | 1,690 | 2,500 | 5.36 |
| 25 | 1,000 | 1,100 | 5/10 | 60 | 1.41 | 1,675 | 2,595 | 5.46 |
| 26 | 1,000 | 1,150 | 5/10 | 60 | 1.32 | 1,655 | 2,550 | 5.44 | having a value of $(B_dH_d)_{max}$ in excess of $1.2 \times 10^6$ g. oe. thereby indicating very desirable ferrite materials.

The procedures described in connection with Examples 1–4 were repeated again using lead monosilicate as the source of $SiO_2$ with an initial ratio of PbO to $Fe_2O_3$ of 1:5 to produce $PbO \cdot 4Fe_2O_3 + 0.7\%$ silica.

Similar measurements on the products were made and the results are presented in Table I.

Again it will be observed that Examples 10, 11 and 12 resulted in products having $(B_dH_d)_{max}$ in excess of $1.2 \times 10^6$ g. oe.

Generally when the initial PbO to $Fe_2O_3$ ratio was less than 1:5, the results were not as good, even though the final composition was greater than 1:5.

EXAMPLE 13

The procedure described above for producing lead ferrite material was repeated to obtain $PbO \cdot 4.5Fe_2O_3 + 0.6\%$ $SiO_2$. The silica was added as tribasic lead silicate and the initial ratio of $PbO \cdot Fe_2O_3$ was 1:6. The material was calcined at 1075° C. and various samples were sintered at temperatures ranging from 1000 to 1150° C. The optimum $(B_dH_d)_{max}$ for this series was $1.22 \times 10^6$ g. oe. for the material sintered at 1150° C. The lower value as compared with earlier examples is attributable to the fact that the initial ratio of $PbO \cdot Fe_2O_3$ was 1:6 instead of a higher value.

EXAMPLE 14

The procedure described in the foregoing examples was repeated using tribasic lead silicate as the source of silica It will be observed that the unusually high $(B_dH_d)_{max}$ values above 1.38 are attributable to optimum conditions and proportions of the ingredients.

The procedure described above was again repeated to make the product $PbO \cdot 5Fe_2O_3 + 0.3\%$ $SiO_2$ (added as tribasic lead silicate). In this series of tests, however, the initial ratio of $PbO \cdot Fe_2O_3$ was 1:6. The usual measurements were made and the results are also presented in Table II.

Here it will be observed that $(B_dH_d)_{max}$ values above $1.2 \times 10^6$ g. oe. were obtained at sintering temperatures of 1100° and 1150° C. These values represent desirable ferrite materials. The somewhat lower values are attributable to the fact that the initial ratio of PbO to $Fe_2O_3$ was somewhat lower than the optimum.

The procedure described above for making the essentially unoriented hard lead ferrites was repeated to make a series of products of the formula $PbO \cdot 4Fe_2O_3 + 0.8\%$ $SiO_2$. The silica was added as quartz having a particle size of approximately 105 $\mu m$ (140 mesh). The initial ratio of the $PbO \cdot Fe_2O_3$ was 1:5. The results are also presented in Table II (Examples 23–26).

It will be observed that the samples sintered at 1050° to 1150° C. had values of $(B_dH_d)_{max}$ between 1.32 and $1.41 \times 10^6$ g. oe., the latter value being achieved at the sintering temperature of 1100° C.

In another series, lead ferrite materials were made corresponding to the composition $PbO \cdot 3.5Fe_2O_3 + 0.9\%$ $B_2O_3$. The initial ratio of $PbO \cdot Fe_2O_3$ was 1:5 and the boria was added as lead borate, the usual measurements were made and the data are summarized in Table III (Examples 27–30).

TABLE III

| Example Number | Calcining temp. (° C.) | Sintering temp. (° C.) | Heating rate (deg./min.) | Soaking time (min.) | $(B_dH_d)_{max.}$ ($\times 10^6$ g. oe.) | Coercive force, $H_c$ (oe.) | $B_r$ (gauss) | Bulk density (g./cc.) |
|---|---|---|---|---|---|---|---|---|
| \multicolumn{9}{c}{$PbO \cdot 3.5Fe_2O_3 + 0.9\%$ boria (as lead borate)—initially 1:5} |
| 27 | 1,000 | 1,000 | 5/10 | 60 | 1.29 | 1,715 | 2,475 | 5.31 |
| 28 | 1,000 | 1,050 | 5/10 | 60 | 1.24 | 1,815 | 2,385 | 5.32 |
| 29 | 1,000 | 1,100 | 5/10 | 60 | 1.18 | 1,740 | 2,380 | 5.21 |
| 30 | 1,000 | 1,150 | 5/10 | 60 | 1.16 | 1,790 | 2,330 | 5.07 |
| \multicolumn{9}{c}{$PbO \cdot 4.5Fe_2O_3 + 0.3\%$ boria (as lead borate)—initially 1:5} |
| 31 | 1,000 | 1,000 | 5/10 | 60 | 1.16 | 1,730 | 2,340 | 4.74 |
| 32 | 1,000 | 1,050 | 5/10 | 60 | 1.27 | 1,755 | 2,455 | 5.03 |
| 33 | 1,000 | 1,100 | 5/10 | 60 | 1.34 | 1,745 | 2,535 | 5.16 |
| 34 | 1,000 | 1,150 | 5/10 | 60 | 1.48 | 1,730 | 2,685 | 5.29 |

It will be noted that the highest value of $(B_dH_d)_{max}$ was $1.29 \times 10^6$ g. oe. which was obtained in the case of the material sintered at 1000° C.

In still another series lead ferrites were made having the composition $PbO \cdot 4.5Fe_2O_3 + 0.3\%$ $B_2O_3$. The usual measurements were made and the data are also summarized in Table III (Examples 31–34).

In this case also the initial ratio of $PbO \cdot Fe_2O_3$ was 1:5 and the boria was added as lead borate. The exceptionally high value of $(B_dH_d)_{max}$ of $1.48 \times 10^6$ was realized at a sintering temperature of 1150° C.

EXAMPLE 35

The procedure described in Examples 27 to 34 was repeated except that the calcining temperature was 1075° C. instead of 1000° C. and the initial ratio of $PbO:Fe_2O_3$ was 1:5.5 instead of 1:5. The product had the composition $PbO \cdot 4.5Fe_2O_3 + 0.5\%$ $B_2O_3$. In this case, the highest value of $(B_dH_d)_{max}$ was obtained at a sintering temperature of 1100° C., i.e. $1.1 \times 10^6$ g. oe. This lower value is attributed to the higher initial ratio of $Fe_2O_3:PbO$.

An investigation was made into the effect of sintering temperature upon residual flux density $B_r$ in making hard ferrite materials in accordance with this invention.

The following materials were tested:

$PbO \cdot 5Fe_2O_3$
$PbO \cdot 4Fe_2O_3$
$PbO \cdot 4.5Fe_2O_3 + 0.3\%$ $B_2O_3$
$PbO \cdot 4Fe_2O_3 + 0.6\%$ $B_2O_3$
$PbO \cdot 3.5Fe_2O_3 + 0.6\%$ $SiO_2$ The data are represented graphically in FIG. 1. These data confirm that substantial improvement in the residual flux density is realized by adding certain amounts of $SiO_2$ or $B_2O_3$ to lead ferrites.

Measurements of coercive force $H_c$ on the same materials were also made and are also represented graphically in FIG. 2. The data indicate that the coercive force remains essentially unchanged as compared with $PbO \cdot 5Fe_2O_3$ Finally, the values of $(B_dH_d)_{max}$ on the same materials were obtained and are also presented graphically in FIG. 3. It will be observed that in most every instance the value for the lead ferrites of the present invention are substantially above $1.2 \times 10^6$ g. oe. and in one instance, that is, in the case of the $PbO \cdot 5Fe_2O_3 + 0.3\%$ $B_2O_3$ sintered at 1150° C., the value reached about $1.48 \times 10^6$ g. oe.

The results presented in FIGS. 1, 2 and 3 also show the importance of sintering at a temperature in the range about 1000–1150° C., preferably about 1050–1150° C.

In order to compare quantitatively the preparation of lead ferrite materials made by adding the silica components to the calcined material as compared with adding the silica component to the uncalcined material, a number of tests were made on ferrites having the composition $PbO \cdot 4Fe_2O_3 + 0.8\%$ silica. The data on the preparation of the respective samples by procedure 1 (adding the silica to the uncalcined ferrite) and procedure 2 (adding the silica to the calcined ferrite) are presented in Table IV.

TABLE IV.—COMPARISON OF FLUXING EFFECT OF SILICA ADDITIONS MADE TO RAW AND TO CALCINED MATERIAL

| Example Number | Sintering temp. (° C.) | Density, g./cc. Green | Density, g./cc. Sintered bulk | Percent volume shrinkage | Percent linear shrinkage |
|---|---|---|---|---|---|
| \multicolumn{6}{c}{$PbO \cdot 4Fe_2O_3 + 0.8\%$ silica—procedure 1 [1]} |
| 35 | 1,000 | 3.75 | 5.24 | 31.95 | 12.52 |
| 36 | 1,075 | 3.56 | 5.50 | 35.33 | 14.47 |
| 37 | 1,150 | 3.57 | 5.49 | 35.33 | |
| 38 | 1,225 | 3.56 | 5.74 | 38.37 | 14.88 |
| \multicolumn{6}{c}{$+ PbO \cdot 4Fe_2O_3 + 0.8\%$ silica—procedure 2 [2]} |
| 39 | 1,000 | 3.19 | 4.95 | 35.90 | 12.33 |
| 40 | 1,050 | 3.21 | 5.36 | 40.55 | 14.68 |
| 41 | 1,100 | 3.19 | 5.46 | 41.80 | 15.45 |
| 42 | 1,150 | 3.19 | 5.44 | 41.65 | 15.66 |

[1] Additions made to the raw (unfired) oxide.
[2] Additions made to prefired material.

In comparing the initial green densities of the specimens prepared by the two methods with the final densities and by also comparing the volume shrinkages in the two cases, one discovers that when the additive is added to the prereacted ferrite there is a considerable fluxing effect so that even though the initial green densities of these specimens were lower than those prepared according to the first procedure the final sintered densities (for like-sintered specimens) were about the same. The residual induction, $B_r$ (also called the residual flux density) is by definition the flux per unit area. Since the areas of the specimens are proportional to the diameters squared, it becomes apparent that the fluxing effect of the additives (in procedure 2) succeeds in reducing the cross-sectional areas of these specimens thereby increasing the $B_r$, or residual flux density values of these specimens.

The comparative data on the maximum energy product $(B_dH_d)_{max}$ and residual flux density $B_r$ are presented graphically in FIGS. 4a and 4b. It will be noted that in the case of the additions to the calcined material maximum energy products in the order of 1.3 to $1.4 \times 10^6$ g. oe. are readily obtainable as compared with the maximum value of $1.1 \times 10^6$ g. oe. in the case of additions to the uncalcined material. A similar comparison can be made in the case of the residual flux densities $B_r$.

Electronmicrographic studies have shown that there is a difference in microstructure when the addition is made to the raw materials, as compared to when it is made to the calcined ferrite. In the first case the ferrite crystals are surrounded by a grain boundary film, whereas in the second case the grain boundary material consisted of discrete, globular particles. The difference in distribution or form of the grain boundary material has a significant effect on the magnetic properties. For example, a specimen prepared according to the first procedure (Example 37 in Table IV) had an energy product $(B_dH_d)_{max} = 1.09 \times 10^6$ g. oe., a $B_r = 2300$ G and an $_IH_c$ (intrinsic coercive force) of 2550 oe. whereas a specimen prepared according to the second procedure (Example 41 of Table IV) had a $(B_dH_d)_{max} = 1.41 \times 10^6$ g. oe., a $B_r$ of 2529 G and an $_IH_c$ of 1690 oe. The densities of the two specimens were 5.49 and 5.46 respectively.

Thus, when the addition of silica or boria is made to the initial raw materials which are then calcined, ground and fired, it is distributed more evenly and it reacts with the ferrite crystal more than when it is added to the calcined materials. As a result, in the former case, the coercive force is higher because the non-magnetic film enveloping the ferrite crystals acts as a barrier to domain wall motion. The $(B_dH_d)_{max}$ values were higher in the latter case mainly due to the increased fluxing effect when the addition is made to the calcined material.

It should also be noted that when lead silicate and lead borate were added to the precalcined material, the optimum initial $PbO:Fe_2O_3$ ratio (that is, the optimum ratio before the addition) was about 1:5. In this way when the silicate or borate used was of the eutectic composition a near optimum final composition was assured.

The effect of silica and boria additions on texture

As previously pointed out, the present invention is directed to magnetic lead ferrites which are essentially unoriented or "isotropic." It has been found, however, that in following the procedure described herein some slight amount of orientation does inherently take place due to the fact that the pressing operation imparts a slight amount of orientation to the grains. Furthermore, during sintering, the degree of such orientation increases as a result of grain growth since the growth rate in the basal plane is greater than in the $c$-direction.

It happens thus, that the silica and boria enhance the degree of orientation over that of the non-doped specimens and that this phenomenon accounts in part for the higher values of residual induction and maximum energy product exhibited by samples having these additives made to the calcined material. A measure of the degree of orientation can be obtained from the ratio of $B_r$ measured perpendicular to the the pressing direction over the $B_r$ measured parallel to that direction. The closer to zero the $$B_{r_\perp}/B_{r_\parallel}$$

ratio, the greater the orientation. The perfectly oriented sample would have $$B_{r_\perp}/B_{r_\parallel}$$

equal zero. As shown in Table V the $$PbO \cdot 4.5Fe_2O_3 + 0.3\%$$

$B_2O_3$ specimens had lower $$B_{r_\perp}/B_{r_\parallel}$$

ratios than the non-doped $PbO \cdot 5Fe_2O_3$. In Table V, Examples 43 to 46 are those in which the borate was added to the precalcined material, whereas in Examples 47 to 49 there was no borate addition.

their $c$-axes in the short dimension. Hence, during pressing, the larger grains experience a mechanical moment or couple which tends to align them with their short dimension (or $c$-axes) parallel to the pressing direction (the smaller grains experience a smaller moment). Then during sintering, as the density of the specimens increases (and the porosity decreases), a point is reached where the larger well-oriented grains grow at the expense of their less well-oriented smaller neighbors. It is well known that the course of the grain growth process may be very strongly influenced by the presence of a liquid phase. If the liquid has a low melting point compared to the solid grains (as is the case here) the presence of a liquid phase may speed up grain growth. One way in which this may occur is by a solution reprecipitation mechanism whereby small grains dissolve in the liquid, the dissolved material then precipitating out on the larger grains. In the silica or boria doped ferrites such a mechanism would be expected to increase the degree of orientation.

I claim:
1. The method for making an essentially unoriented hard lead ferrite, which comprises calcining a mixture of lead oxide and iron oxide powders in the mole ratio of about 1:4.5 to 1:5.5 PbO to $Fe_2O_3$ equivalent, at a temperature of about 850° to 1150° C. to form a PbO·iron oxide calcine, grinding said calcine, incorporating in said calcine a material of the group consisting of lead silicate, silica, lead borate and boria in amount sufficient to produce an overall mole ratio in the range of about 1:3.5 to 1:5.5 PbO to $Fe_2O_3$ and about 0.2 to 0.9% by weight $SiO_2$ or $B_2O_3$, pressing said calcine and incorporated material into slugs and sintering said slugs at a temperature in the range of about 1000° to 1150° C. to form a sintered hard lead ferrite having an energy product of at least $1.2 \times 10^6$ gauss-oersteds.

2. The method described in claim 1 wherein the sintered ferrite has a ratio of PbO to $Fe_2O_3$ in the range of about 1:3.5 to 1:5.

3. The method described in claim 1 wherein the calcining is carried out at a temperature of about 1000–1075° C.

4. The method described in claim 1 wherein the sintering step is carried out at a temperature in the range of about 1050–1150° C.

5. The method described in claim 1 wherein the ratio of PbO to $Fe_2O_3$ after calcining but before sintering is about 1:5.

6. The method described in claim 1 wherein the lead silicate or lead borate in the final sintered material has a eutectic ratio of $PbO:SiO_2$ or $PbO:B_2O_3$.

TABLE V.—EFFECT OF LEAD BORATE ADDITIONS ON DEGREE OF ORIENTATION

| Example Number | Sintering Temp. (°C.) | $BH_{max.\parallel}$ ×10⁻⁶ g.oe. | $B_r''$ | $B_{r\perp}$ | $B_{r\perp}/B_r''$ | $BH_{max\perp}$ ×10⁻⁶ g. oe. | Density, g./cc. |
|---|---|---|---|---|---|---|---|
| $PbO \cdot 4.5Fe_2O_3 + 0.3\%\ B_2O_3$ | | | | | | | |
| 43 | 1,000 | 1.16 | 2,340 | 1,520 | 0.65 | 0.44 | 4.74 |
| 44 | 1,050 | 1.27 | 2,455 | 1,605 | 0.65 | 0.53 | 5.03 |
| 45 | 1,100 | 1.34 | 2,535 | 1,495 | 0.59 | 0.52 | 5.16 |
| 46 | 1,150 | 1.48 | 2,685 | 1,525 | 0.57 | | 5.29 |
| $PbO \cdot 5Fe_2O_3$ | | | | | | | |
| 47 | 1,000 | 0.95 | 2,100 | 1,585 | 0.75 | | 4.53 |
| 48 | 1,075 | 1.00 | 2,270 | 1,695 | 0.75 | | 4.87 |
| 49 | 1,150 | 1.13 | 2,335 | 1,635 | 0.70 | | 5.01 |

It should be noted that the degree of orientation increased with increasing sintering temperature (and density). This may be explained in the following manner. It is likely that in the "as pressed" condition the specimens contain a number of grains somewhat larger than the average and that these larger grains are oriented with their $c$-axes parallel to the direction of pressing whereas the smaller grains are misoriented. This phenomenon occurs because the ferrite particles tend to be platelet-shaped as a result of the comminution procedure, with 7. The method described in claim 1 wherein the additive is (1) tribasic lead silicate, or (2) lead monosilicate, or (3) quartz, or (4) lead borate or (5) $B_2O_3$.

8. The method described in claim 1 wherein the additive is lead silicate or lead borate.

9. The method described in claim 1 wherein the final sintered hard lead ferrite has an energy product of about $1.3–1.4 \times 10^6$ gauss-oersteds.

10. The method described in claim 1 wherein said pressing produces slight orientation of the particles, which orientation is increased during sintering by crystal growth thereby to obtain a product having high residual induction of at least about 2.3 kilogausses.

11. An essentially unoriented sintered hard lead ferrite having an energy product of at least $1.2 \times 10^6$ gauss-oersteds consisting essentially of finely-divided particles of material having the composition of about 1:3.5 to 1:5.5 ratio of PbO to $Fe_2O_3$, and about 0.2 to 0.9% by weight $SiO_2$ or $B_2O_3$ combined with the PbO in the form of lead silicate or lead borate, said lead silicate or lead borate being retained at the grain boundaries in the form of discrete globular particles to produce a non-magnetic barrier to domain-boundary motion.

12. An essentially unoriented sintered ferrite as described in claim 11, in which the ratio of PbO to $Fe_2O_3$ is in the range 1:3.5 to 1:5.

13. The method for making an essentially unoriented hard lead ferrite, which comprises calcining a mixture of lead oxide and iron oxide powders in the mole ratio of about 1:4.5 to 1:6 PbO to $Fe_2O_3$ equivalent, at a temperature of about 850° to 1150° C. to form a PbO·iron oxide calcine, grinding said calcine, incorporating in said calcine a material of the group consisting of lead silicate, silica, lead borate and boria in amount sufficient to produce an overall mole ratio in the range of about 1:3.5 to 1:5.5 PbO to $Fe_2O_3$ and about 0.2 to 0.9% by weight $SiO_2$ or $B_2O_3$, pressing said calcine and incorporated material into slugs and sintering said slugs at a temperature in the range of about 1000° to 1150° C. to form a sintered hard lead ferrite having an energy product of at least $1.2 \times 10^6$ gauss-oersteds.

References Cited

UNITED STATES PATENTS

| | | | |
|---|---|---|---|
| 2,980,617 | 4/1961 | Ireland | 252—62.63X |
| 3,337,461 | 8/1967 | Cochardt | 252—62.63X |
| 3,375,196 | 3/1968 | Muramori et al. | 252—62.63 |

FOREIGN PATENTS

| | | | |
|---|---|---|---|
| 927,855 | 6/1963 | Great Britain | 252—62.63 |
| 371,382 | 9/1963 | Switzerland | 252—62.63 |

TOBIAS E. LEVOW, Primary Examiner

J. COOPER, Assistant Examiner

U.S. Cl. X.R.

252—62.59, 62.63